United States Patent
Barrett et al.

(10) Patent No.: US 9,383,533 B2
(45) Date of Patent: Jul. 5, 2016

(54) PROBING CABLE

(71) Applicant: ROLLS-ROYCE PLC, London (GB)

(72) Inventors: Christopher John Barrett, Derby (GB); Ashley Bryant, Derby (GB); William Matthew Steging Boyle, Glasgow (GB); Katherine May Carson, London (GB)

(73) Assignee: ROLLS-ROYCE plc, London (GB)

( * ) Notice: Subject to any disclaimer, the term of this patent is extended or adjusted under 35 U.S.C. 154(b) by 125 days.

(21) Appl. No.: 14/371,190

(22) PCT Filed: Jan. 22, 2013

(86) PCT No.: PCT/EP2013/051109
§ 371 (c)(1),
(2) Date: Jul. 9, 2014

(87) PCT Pub. No.: WO2013/110592
PCT Pub. Date: Aug. 1, 2013

(65) Prior Publication Data
US 2015/0010281 A1   Jan. 8, 2015

(30) Foreign Application Priority Data
Jan. 23, 2012  (GB) .................................. 1201045.0

(51) Int. Cl.
| G02B 6/50 | (2006.01) |
| G02B 6/44 | (2006.01) |
| G02B 6/54 | (2006.01) |
| H02G 1/08 | (2006.01) |

(52) U.S. Cl.
CPC ............ *G02B 6/4428* (2013.01); *G02B 6/4463* (2013.01); *G02B 6/4479* (2013.01); *G02B 6/50* (2013.01); *G02B 6/54* (2013.01); *H02G 1/08* (2013.01); *Y10T 29/49826* (2015.01)

(58) Field of Classification Search
None
See application file for complete search history.

(56) References Cited

U.S. PATENT DOCUMENTS

| 5,245,740 | A   |   | 9/1993  | Araki et al. |            |
|-----------|-----|---|---------|--------------|------------|
| 5,964,288 | A   | * | 10/1999 | Leighton     | E21B 23/03 |
|           |     |   |         |              | 166/207    |
| 6,675,901 | B2  | * | 1/2004  | Johnson      | E21B 7/20  |
|           |     |   |         |              | 138/129    |
| 6,679,334 | B2  | * | 1/2004  | Johnson      | E21B 7/20  |
|           |     |   |         |              | 166/207    |
| 7,185,677 | B2  | * | 3/2007  | Houston      | A61F 2/06  |
|           |     |   |         |              | 138/112    |
| 7,766,082 | B2  | * | 8/2010  | Teixeira     | E21B 17/22 |
|           |     |   |         |              | 166/231    |
| 2003/0075361 | A1 | * | 4/2003 | Terry       | G01V 3/30  |
|           |     |   |         |              | 175/61     |
| 2004/0017730 | A1 | * | 1/2004 | Jackson     | E21B 47/01 |
|           |     |   |         |              | 367/25     |
| 2004/0040707 | A1 | * | 3/2004 | Dusterhoft  | E21B 17/206|
|           |     |   |         |              | 166/279    |

(Continued)

FOREIGN PATENT DOCUMENTS

| DE | 4 417 428 C1 | 11/1995 |
| EP | 0 683 495 A1 | 11/1995 |

(Continued)

OTHER PUBLICATIONS

Apr. 17, 2013 International Search Report issued in International Application No. PCT/EP2013/051109.

(Continued)

*Primary Examiner* — Tina Wong
(74) *Attorney, Agent, or Firm* — Oliff PLC

(57) ABSTRACT

A probing cable for deployment inside a pipe formation has a resiliently deformable tip member which extends from the end of the cable at an angle from the length direction of the cable. The tip member helps to guide the probing cable around corners and junctions in the pipe formation.

13 Claims, 2 Drawing Sheets

(56) References Cited

U.S. PATENT DOCUMENTS

| | | | |
|---|---|---|---|
| 2004/0079929 A1 | 4/2004 | Delaforce et al. | |
| 2004/0094961 A1* | 5/2004 | Richards | E21B 17/042 285/370 |
| 2004/0231859 A1* | 11/2004 | Huber | E21B 23/00 166/381 |
| 2005/0045343 A1* | 3/2005 | Bixenman | E21B 17/206 166/385 |
| 2007/0227727 A1* | 10/2007 | Patel | E21B 17/028 166/250.01 |
| 2008/0115971 A1* | 5/2008 | Kelleher | E21B 21/001 175/5 |
| 2008/0294008 A1 | 11/2008 | Toyama | |
| 2015/0308258 A1* | 10/2015 | Logan | E21B 33/0385 73/152.54 |

FOREIGN PATENT DOCUMENTS

| | | |
|---|---|---|
| GB | 2 150 905 A | 7/1985 |
| JP | A-2000-131570 | 5/2000 |
| JP | A-2000-166858 | 6/2000 |
| JP | A-2003-004434 | 1/2003 |
| RU | 2 195 678 C1 | 12/2002 |
| WO | WO 2010/092478 A2 | 8/2010 |

OTHER PUBLICATIONS

May 21, 2012 British Search Report issued in British Application No. 1201045.0.

* cited by examiner

PROBING CABLE

FIELD OF THE INVENTION

The present invention relates to a probing cable for deployment inside a pipe formation.

BACKGROUND OF THE INVENTION

Inspection and monitoring of pipes is essential for a range of systems. For example, Advanced Gas-cooled Reactor (AGR) pod boilers are largely uninspected, but new life extension plans require an increased knowledge of the internal conditions of the boiler pipes. One proposed method for acquiring this knowledge is to deploy fibre optic cables into redundant pipes to act as inspection and monitoring tools. However, the pipe geometry can be complex and internal conditions can be poorly defined, presenting numerous problems for cable deployment.

Water flooding and air jetting can be used to facilitate cable deployment. Nonetheless deployment of cables into helical pipes can be problematic due to the capstan effect. Essentially, as the cable is pushed through the turns of a helical pipe it experiences an exponential build up in frictional resistance which can rapidly prevent further cable deployment.

SUMMARY OF THE INVENTION

An aim of the present invention is to provide a probing cable, e.g. including a fibre optic cable, which facilitates deployment inside a pipe formation with, for example, helical turns.

Accordingly, in a first aspect, the present invention provides a probing cable for deployment inside a pipe formation, the cable having an outer casing and an elongate probe member which threads along a bore defined by the outer casing, wherein the outer casing has a helical track which wraps around its outer surface.

Advantageously, it has been found that when the outer casing has the helical track and a torsion is applied to the cable about its length direction, frictional resistance due to the capstan effect can be more easily overcome. This may be due to the track acting in the manner of a thread where it contacts internal surfaces of pipe formation, effectively allowing the cable to screw its way into the pipe formation. Reversing the torsion on the cable can, in a similar manner, assist with the withdrawal of the cable from the pipe formation. Generally, however, any such "screwing" action is insufficient by itself to insert or withdraw the cable, and usually the cable must be simultaneously pushed through or pulled from the pipe formation to respectively effect insertion or withdrawal.

Optional features of the probing cable will now be set out. These are applicable singly or in any combination.

The elongate probe member can include one or more optical fibres and/or wires (e.g. electrical or thermocouple wires). The probe member can be used for image collection, data collection, thermal monitoring, ultrasonic inspection, sampling etc. The probe member may thus include one or more devices (typically at the end of the cable) such as imaging systems, sampling devices, ultrasound probes etc.

The outer casing can be formed from a helical spring. Preferably the spring is tightly wound such that there are substantially no spaces between adjacent turns of the spring. This can provide a flexible and strong casing, and conveniently the turns of the spring are already in the form of a helical track such that further shaping of the spring may not be required. Lengths of spring can be joined end-to-end to form a longer cable. For use in high temperature and/or oxidising/corrosive environments, the spring may be formed from stainless steel.

The cable diameter may be at least 2 mm and preferably at least 3 mm. The cable diameter may be at most 10 mm and preferably at most 6 mm. The cable diameter may be at least five times greater than the pitch of the helical track (in the case of a helical spring outer casing, the pitch is typically equal to the diameter of the wire used to form the spring), and preferably may be at least six or seven times greater. The cable diameter may be at most ten times greater than the pitch of the helical track, and preferably may be at most eight times greater.

The probing cable may also have a resiliently deformable tip member which extends from the end of the cable at an angle from the length direction of the cable. Advantageously the tip member can assist in directing the cable into a side passage, or selecting a desired passage at a bifurcation. For example, the tip member can be formed from a length of helical spring which extends from the end of the cable, such a spring being resiliently deformable. The tip member can further have a relatively hard head formation at its distal end to provide a point of reaction against passage walls. In a second aspect, the present invention provides a method of deploying a probing cable inside a pipe formation, the method including the steps of:
  providing the probing cable of the first aspect (including any optional features thereof); and
  pushing the cable through the pipe formation while rotating the cable about its length direction to apply a torsion to the cable.

To insert the cable into the pipe formation the rotation should generally be applied in the sense of the helical track to allow the cable to screw its way into the pipe formation.

Optional features of the method will now be set out. These are applicable singly or in any combination.

The pipe formation may have a passage which completes one or more helical turns and through which the cable is pushed.

The method may further include the step of pulling the cable out of the pipe formation while rotating the cable about its length direction in the reverse direction to apply an opposite torsion to the cable.

The pipe formation may have a first passage and a second passage which branches therefrom and, in the pushing step, the cable may be pushed through the first passage. In this scenario, when the cable has a resiliently deformable tip member which extends from the end of the cable at an angle from the length direction of the cable, the resiliently deformable tip member can be sized to contact the wall of the first passage such that the tip member is urged into closer alignment with the length direction of the cable. The method may then further include the steps of:
  rotating the cable about its length direction when the end of the cable is at the entrance to the second passage such that the tip member resiles away from the length direction of the cable and into the second passage; and
  further pushing the cable through the pipe formation while rotating the cable about its length direction to apply a torsion to the cable such that the cable follows the tip member into the second passage.

The cable may have an appropriate monitor, such as an imaging system, at its end to determine when the end is at the entrance to the second passage. Alternatively or additionally, if the distance along the first passage of the entrance to the second passage is known, then measuring the length of cable inserted into the pipe formation may be enough to determine when the end of the cable is at the entrance to the second passage. Another possibility is that the first passage may have a blockage feature, such as a raised lip which circles the first passage, adjacent to the entrance to the second passage, the feature providing increased resistance to further insertion into the first passage.

Although the cable of the first aspect will generally be deployed while rotating the cable about its length direction to apply a torsion to the cable, it is possible that the pipe formation may be shaped such that it is unnecessary to rotate the cable while pushing it through the formation (e.g. the pipe receiving the cable may have no or only slight turns), at least until after the cable has entered a second passage which branches from a first passage. Accordingly, in a third aspect, the present invention provides a method of deploying a probing cable inside a pipe formation having a first passage and a second passage which branches therefrom, the method including the steps of:

providing the probing cable of the first aspect, the cable further having a resiliently deformable tip member which extends from the end of the cable at an angle from the length direction of the cable;

pushing the cable through the first passage, the resiliently deformable tip member being sized to contact the wall of the first passage such that the tip member is urged into closer alignment with the length direction of the cable;

rotating the cable about its length direction when the end of the cable is at the entrance to the second passage such that the tip member resiles away from the length direction of the cable and into the second passage; and further pushing the cable such that the cable follows the tip member into the second passage.

In the method of the second or third aspect, the pipe formation may be a boiler pipe, e.g. a nuclear reactor boiler pipe. Indeed, a fourth aspect of the present invention provides the use of the probing cable of the first aspect (including any optional features thereof) for probing a boiler pipe such as a nuclear reactor boiler pipe.

A fifth aspect of the present invention provides a system for deploying a probe inside a pipe formation, the system including:

a probing cable of the first aspect (including any optional features thereof); and a deployment device having a winding drum about which the probing cable is wound, and having a cradle for the winding drum, wherein the cradle supports the drum such that it is rotatable about the drum axis to unwind cable from the drum for pushing through the pipe formation, and the cradle is configured such that the winding drum is rotatable about the length direction of the unwound cable to apply a torsion thereto.

For example, the cradle can have a first sub-frame which supports the drum such that it is rotatable about the drum axis, and can have a second sub-frame which rotatably supports the first sub-frame such that the winding drum is rotatable about the length direction of the unwound cable. In such an arrangement, the unwound cable can be fed along the axis of rotation of the first sub-frame relative to the second sub-frame.

A sixth aspect of the present invention provides the deployment device, or the cradle of the deployment device, of the fifth aspect.

A seventh aspect of the present invention provides the use of the system of the fifth aspect for probing a boiler pipe such as a nuclear reactor boiler pipe.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
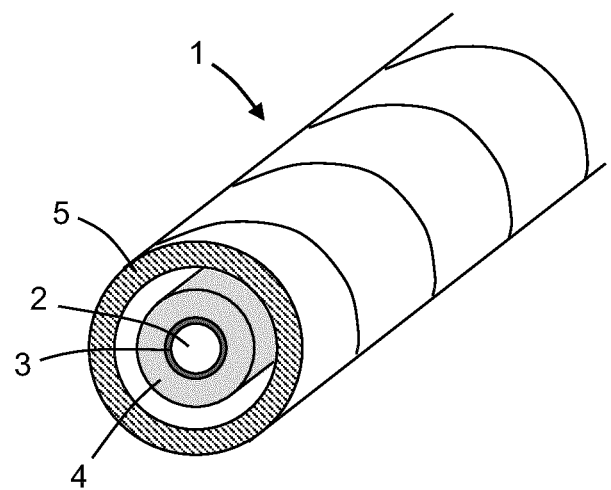
FIG. 1 shows schematically a probing cable according to the present invention.

As shown schematically in FIG. 1, probing cables according to embodiments of the present invention have been produced in which each cable 1 has an optical fibre core 2 for temperature monitoring or visualisation inside AGR pod boilers. The optical fibre is gold-plated 3 to protect the fibre from moisture, and then covered in a stainless steel braided sleeve 4. The covered optical fibre is inserted into the bore of an outer casing 5, the braided sleeve protecting the gold plating from rubbing contact with the casing. The outer casing can conveniently be formed from a tightly wound, stainless steel, helical spring. Typically these are available in up to 6-12 m lengths. To make longer probing cables, such lengths can be joined end-to-end, e.g. by fusing, brazing or welding butted ends of the lengths.

By rotating such a cable as it is pushed into a pipe it is possible to generate a torsion in the cable that can overcome frictional resistance to cable insertion due to the capstan effect. In particular, it seems that the helical track on the outer surface of the casing formed by the turns of the spring acts in the manner of a thread, whereby the torsion allows the cable to an extent to screw into the pipe. Thus the torsion should be applied in the appropriate direction for the sense of the thread. For withdrawal, the cable is pulled out of the pipe while rotating the cable in the opposite direction. Adopting such an approach, we have been able to push and withdraw such cables relatively easily through over two turns of a helical pipe, which is generally the limiting number of turns for conventional cables. The approach has been applied successfully to deploy cables of from 3 to 6 mm diameter through pipes of up 12 m in length and about 12 to 15 mm in diameter. The pitch of the spring and the size of the helical track can be selected for a given application to improve the ability to overcome frictional resistance.

An outer casing formed from a helical spring is convenient, such springs generally being strong enough to transmit high linear forces, flexible enough in bending to travel around corners, and readily available. Metal springs, in particular, can be formed from a variety of metals and alloys depending on the temperature and environmental requirements. However, non-spring-based outer casings may be used. For example, a polymer-based outer casing may also be sufficiently strong and flexible. Indeed, such a casing could be formed as a continuous sleeve with a helical track rather than as a spring. Of course, a polymer-based casing may not have the temperature capability of a metal casing.

Figure 2:
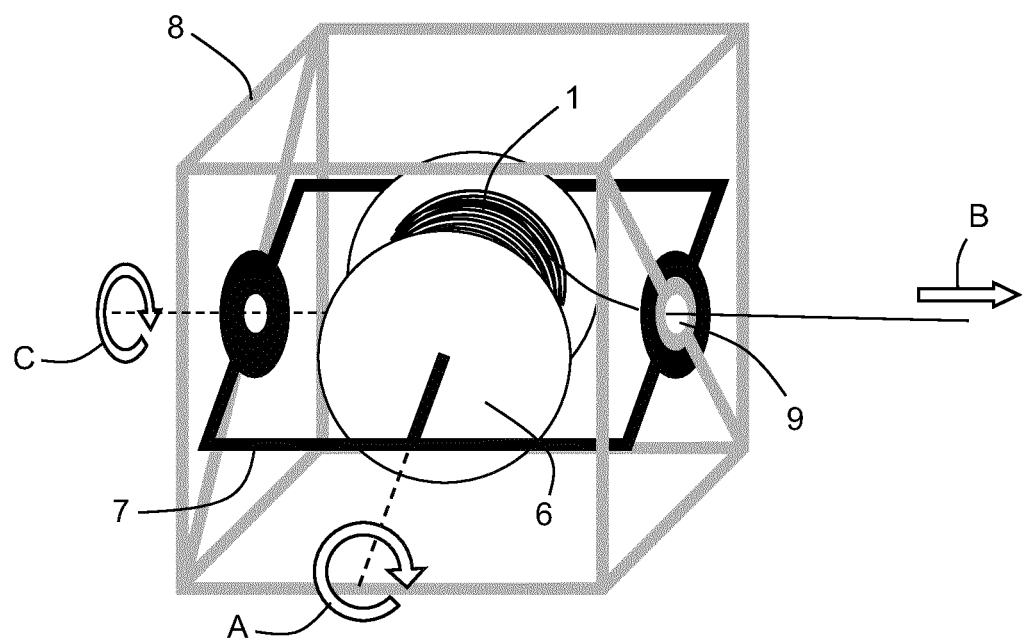
FIG. 2 shows schematically a system for deploying the probing cable of FIG. 1 inside a pipe.

For convenience, the cable is typically wound onto a drum in readiness for deployment. FIG. 2 shows schematically a system for deploying the probing cable inside a pipe. The cable 1 is wound on a drum 6 which is affixed to a cradle. More particularly, the cradle has a first sub-frame 7 to which the drum is rotatably mounted about its axis. Rotation A of the drum allows the cable to be unwound so that a length can be pulled off in a direction B for pushing into a pipe.

The first sub-frame 7 is in turn rotatably mounted to a second sub-frame 8 about an axis aligned with pull-off direction B. Rotation C about this axis rotates the drum 6 such that the torsion can be applied to the unwinding cable. A feed-hole 9 at the rotatable connection between the first and the second sub-frame provides a route for the cable to exit the cradle without interfering with the structure of the cradle.

The system can be developed, e.g. to reduce its overall size and to incorporate further features, such as motors for rotating the first sub-frame 7 and the drum 6, and automated motor control units.

Figure 3:
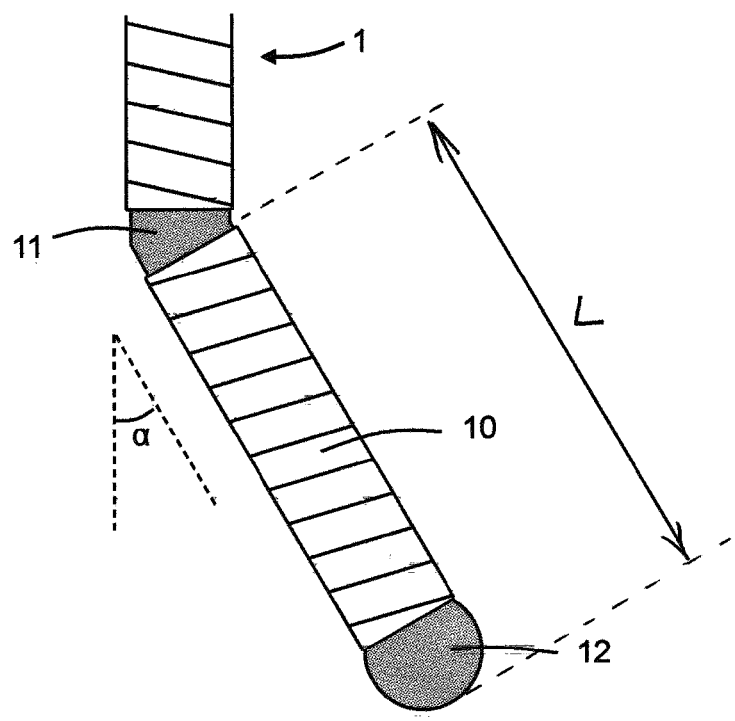
FIG. 3 shows schematically the end of the probing cable of FIG. 1.

FIG. 3 shows schematically the end of the probing cable 1. A resiliently deformable tip member extends from the end at an angle $\alpha$ to the length direction of the cable. The tip member is formed from a relatively short length 10 of helical spring attached to the end of the cable by a dogleg element 11 which is inserted into the bores of respectively the cable and the short length of spring. A ball bearing 12 is fastened to the distal end of the short length of spring to provide a hard point of reaction against passage walls and to provide a smooth top to reduce possible snagging.

The angle $\alpha$ and the length L of the tip member are selected so that, on insertion of the cable 1 through a pipe, the ball bearing 12 pushes against the wall of the pipe such that the tip member is urged into closer alignment with the length direction of the cable (i.e. the angle $\alpha$ is reduced). The angle $\alpha$ and the length L may therefore vary to suit the particular dimensions of the pipes being inspected. However, using basic trigonometry, it will be understood that to achieve this effect (the ball bearing pushing against the wall and the resultant reduction in the angle $\alpha$) the length L must be at least equal to, and preferably greater than, $d/\sin\alpha$, where d is the diameter of the pipe.

Thus, when the tip member encounters an opening to a second pipe from the side of the first pipe, the short length of spring 10 resiles into the opening to reinstate the original angle $\alpha$. Further pushing of the cable results in the cable following the tip member into the opening and along the second pipe. To ensure that the cable proceeds through a desired opening, the cable can be rotated about its length direction when the end of the cable is known to be in the vicinity of the opening. On rotation, the ball bearing traces around the inside of the pipe wall until the opening is reached. A further advantage conferred by the flexibility of the tip member is that as it enters the second pipe, it can bend or deflect to prevent the tip member from jamming between the opposite side walls of the second tube.

Overall, the probing cable and deployment system can provide a robust and relatively low cost solution for the problem of probe deployment in complex pipe geometries. The probe is able to navigate bifurcation joints with an appropriate tip member, and can overcome the exponential build up of friction inside helical coils of pipe. Although developed for use in AGR pod boilers, the cable and system can also be used in many other sectors where similar deployment problems are encountered.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A probing cable for deployment inside a pipe formation, the cable having a resiliently deformable tip member which extends from the end of the cable at an angle from the length direction of the cable, the cable including an outer casing with a helical track configured to allow the cable to screw into the pipe formation.

2. A probing cable according to claim 1, in which the tip member comprises a resilient element attached to the end of the cable by a dogleg element.

3. A probing cable according to claim 2, in which the tip member further comprises a spherical element fastened to the distal end of the resilient element.

4. A method of deploying a probing cable inside a pipe formation, the method including the steps of:
   providing the probing cable of claim 1; and
   pushing the cable through the pipe formation while rotating the cable about its length direction to apply a torsion to the cable.

5. A method according to claim 4, wherein the pipe formation has a passage which completes one or more helical turns and through which the cable is pushed.

6. A method according to claim 4, further including the step of pulling the cable out of the pipe formation while rotating the cable about its length direction in the reverse direction to apply an opposite torsion to the cable.

7. A system for deploying a probe inside a pipe formation, the system including:
   a probing cable according to claim 1; and
   a deployment device having a winding drum about which the probing cable is wound, and having a cradle for the winding drum, wherein the cradle supports the drum such that it is rotatable about the drum axis to unwind cable from the drum for pushing through the pipe formation, and the cradle is configured such that the winding drum is rotatable about the length direction of the unwound cable to apply a torsion thereto.

8. A system according to claim 7, wherein the cradle has a first sub-frame which supports the drum such that it is rotatable about the drum axis, and has a second sub-frame which supports the first sub-frame such that the winding drum is rotatable about the length direction of the unwound cable.

9. The cradle of the deployment device of claim 7.

10. The probing cable according to claim 1 is for probing a boiler pipe.

11. The system according to claim 7 is for probing a boiler pipe.

12. A method of deploying a probing cable inside a pipe formation, the method including the steps of:
   providing the probing cable for deployment inside the pipe formation, the cable having a resilient deformable tip member which extends from the end of the cable at an angle from the length direction of the cable; and
   pushing the cable through the pipe formation while rotating the cable about its length direction to apply a torsion to the cable,
   wherein the pipe formation has a first passage and a second passage which branches therefrom and, in the pushing step, the cable is pushed through the first passage, the resiliently deformable tip member being sized to contact the wall of the first passage such that the tip member is urged into closer alignment with the length direction of the cable, and the method further includes the steps of:

rotating the cable about its length direction when the end of the cable is at the entrance to the second passage such that the tip member resiles away from the length direction of the cable and into the second passage; and further pushing the cable through the pipe formation while rotating the cable about its length direction to apply a torsion to the cable such that the cable follows the tip member into the second passage.

13. A method of deploying a probing cable inside a pipe formation having a first passage and a second passage which branches therefrom, the method including the steps of:

providing the probing cable for deployment inside the pipe formation, the cable having a resiliently deformable tip member which extends from the end of the cable at an angle from the length direction of the cable;

pushing the cable through the first passage, the resiliently deformable tip member being sized to contact the wall of the first passage such that the tip member is urged into closer alignment with the length direction of the cable;

rotating the cable about its length direction when the end of the cable is at the entrance to the second passage such that the tip member resiles away from the length direction of the cable and into the second passage; and further pushing the cable such that the cable follows the tip member into the second passage.

* * * * *